United States Patent [19]

Mathews

[11] Patent Number: 4,512,787

[45] Date of Patent: Apr. 23, 1985

[54] DEVICE FOR FILTERING STACK GASES

[76] Inventor: J. Paul Mathews, 7960 Market St., Youngstown, Ohio 44512

[21] Appl. No.: 543,486

[22] Filed: Oct. 19, 1983

[51] Int. Cl.$^3$ .............................................. B01D 46/10
[52] U.S. Cl. ........................................ 55/284; 55/302; 55/422; 55/481; 55/DIG. 30; 422/171; 422/178
[58] Field of Search ................. 55/284, 293, 302, 303, 55/114, 422, 481, 485, DIG. 30; 422/171, 178

[56] References Cited

U.S. PATENT DOCUMENTS

| 350,059 | 9/1886 | Ince | 55/303 |
|---|---|---|---|
| 2,843,217 | 7/1958 | von Linde | 422/171 |
| 3,375,638 | 4/1968 | Dungler | 55/116 |
| 3,615,248 | 10/1971 | Holler, Jr. | 55/511 |
| 3,686,832 | 8/1972 | Hori et al. | 55/179 |
| 3,823,532 | 7/1974 | Cooper et al. | 55/481 |
| 4,081,255 | 3/1978 | Evans | 55/230 |

FOREIGN PATENT DOCUMENTS

| 2752833 | 6/1979 | Fed. Rep. of Germany | 422/171 |
|---|---|---|---|
| 871076 | 4/1942 | France | 55/284 |

Primary Examiner—David L. Lacey
Attorney, Agent, or Firm—Harpman & Harpman

[57] ABSTRACT

A device for filtering stack gases, such as produced by a coal fired electric generating plant, includes a plurality of movable dual filter elements positioned downstream from the point of combustion where dry solid waste including calcium sulphite (CaSO$_3$) and fly ash are present in the flue gas, the multiple dual filters being arranged for reciprocation into and out of the flue gas stream so that they may be alternately loaded in filtering the dry solid waste from the flue gas and cleaned by a vacuum system, each of the reciprocable dual filters being arranged to actuate a valve controlling communication with the vaccum cleaning system.

6 Claims, 4 Drawing Figures

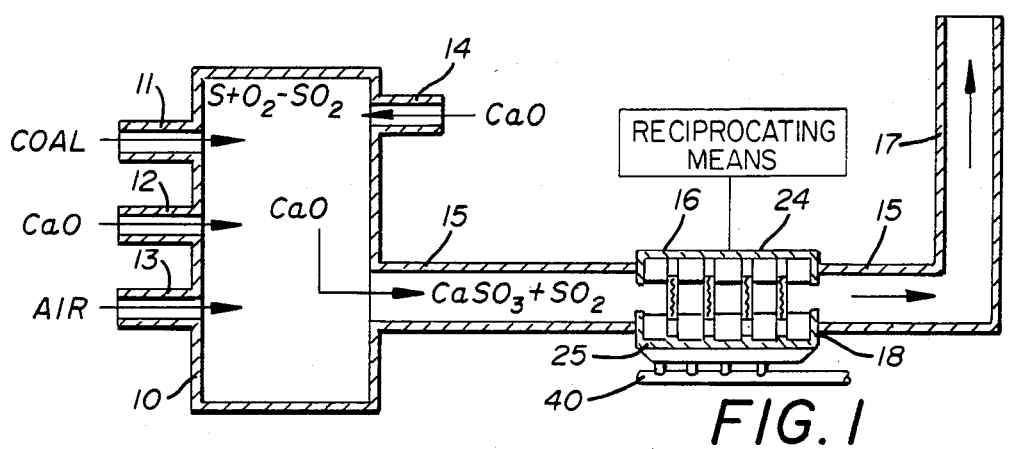
FIG. 1
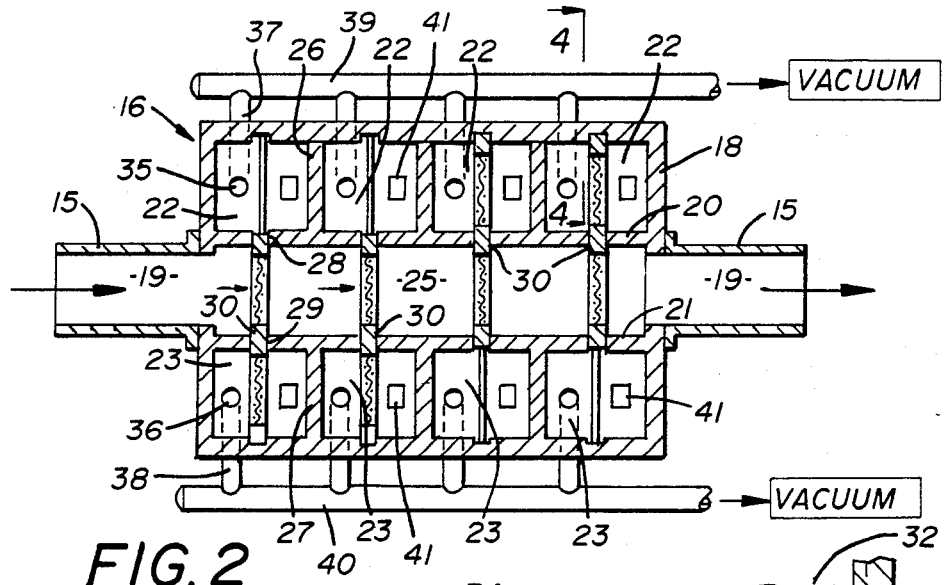
FIG. 2
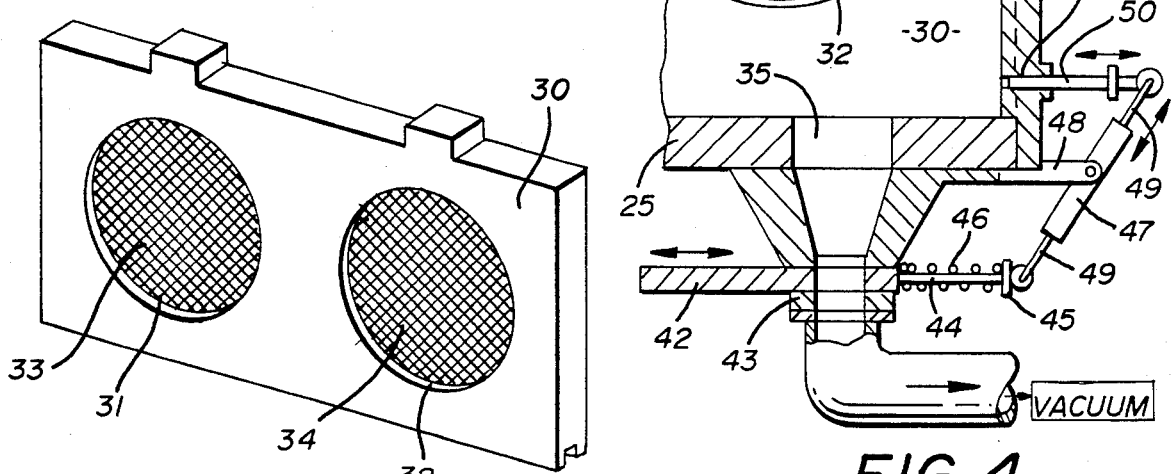
FIG. 3
FIG. 4

DEVICE FOR FILTERING STACK GASES

BACKGROUND OF THE INVENTION

1. Technical Field

This invention relates to systems and devices for filtering stack gases to remove dry solid waste material therefrom.

2. Description of the Prior Art

Prior devices and systems of this type may be seen in U.S. Pat. Nos. 2,843,217, 3,375,638, 3,615,248, 3,686,832 and 4,081,255.

In the U.S. Pat. Nos. 2,843,217 and 3,615,248, rotatable drums incorporating a plurality of circumferentially spaced filter units are revolved into and out of a flue gas path.

In U.S. Pat. No. 2,843,217, the flue gas is passed through two of the circumferentially spaced filters simultaneously, and in U.S. Pat. No. 3,615,249, the flue gas path is through one of the circumferentially spaced filters.

In U.S. Pat. No. 3,375,638, the filters take the from of electrostatically charged belts in spaced relation in the flue gas path with means for moving the belts into and out of the flue gas path.

In U.S. Pat. No. 3,686,832, a horizontally disposed drum having a plurality of filter elements positioned radially about the core thereof are rotated around the flue gas path with valves controlling the direction of the flue gas through the several filters in the horizontally disposed drum.

In U.S. Pat. No. 4,081,255, a track system is provided for moving a carriage carrying two horizontally spaced filter containers into and out of a vertical flue gas path. The present invention provides a housing positioned in the flue gas path and defining a central passageway therethrough and a plurality of chambers on either side thereof with a plurality of dual filter elements in the form of screened panels positioned vertically in the housing and slidable sidewardly so that one screen in each panel is always positioned in the central passageway in a filtering position with respect to the flue gas passing therethrough. The other screen in each of the screen panels forming the dual filter elements is always in one of the chambers at the sides of the central passageway where it is subjected to a cleaning action as by communication with a vacuum system arranged to move air through the screen element in a reverse direction with respect to the flue gas path. The reciprocal dual filter elements actuate valves controlling the communication of the respective chambers in which they are alternately positioned with the vacuum system.

SUMMARY OF THE INVENTION

A device for filtering stack gases utilizes a plurality of dual filter elements, each having a pair of screened openings therethrough in side by side relation and a housing slidably positioning the dual filter elements in spaced relation to one another and defining a central passageway in which one of the screened openings in each of the dual filter elements is positioned. A plurality of chambers are formed along either side of the central passageway and arranged to receive the slidably disposed dual filter elements so that one of the screened openings of each of the dual filter elements is in one of the chambers where it may be cleaned by a reverse flow of air therethrough as occasioned by communication with a vacuum system. The device is such that all of the flue gas carrying the dry solid waste material must pass through one of the filter screens in each of the dual filter elements and the dual filter elements are arranged and activated progressively to move the loaded filter screens to the respective vacuum chambers so as to remove the dry solid waste therefrom.

DESCRIPTION OF THE DRAWINGS

FIG. 1 is a schematic view of a furnace or a boiler with a flue gas passageway communicating with a vent stack with the device of the invention positioned in said passageway;

FIG. 2 is a horizontal section through the device for filtering stack gases;

FIG. 3 is an enlarged perspective detail of one of the dual filter elements illustrated in FIG. 2 of the drawings; and FIG. 4 is an enlarged cross sectional elevation on line 4—4 of FIG. 2 showing a vacuum valve actuating mechanism.

DESCRIPTION OF THE PREFERRED EMBODIMENT

By referring to the drawings and FIG. 1 in particular, a schematic view will be seen to incorporate a furnace 10 which may be a steam generating boiler or the like and having inlet ports 11, 12, 13 and 14 respectively. Powdered coal from a suitable source, not shown, is introduced into the furnace 10 through the inlet port 11. Burnt lime sometimes called quick lime (CaO) is introduced into the furnace 10 through either or both of the inlet ports 12 and 14. Air for combustion, usually supplementing that in which the powdered coal is entrained, is introduced through the inlet port 13 and controlled combustion results which produces a substantially large amount of solid waste particulates in the flue gas which is vented from the furnace 10 by a tubular flue gas passageway 15.

A device 16 for filtering stack gases is positioned in the flue gas passageway 15 and the cleaned flue gases emerge therefrom through an extension of the tubular flue gas passageway 15 and are delivered into a vent stack 17 from which they flow into the atmosphere.

At the present time, a number of electric power generating plants are attempting to control the amount of sulphur dioxide introduced into the atmosphere by feeding powdered limestone into the furnace where it decomposes into calcium oxide which then reacts with the sulphur dioxide from the coal to form calcium sulphite ($CaSO_3$). This method is relatively inefficient and results in a large amount of solid waste which has to be removed from the flue gas and this is ordinarily attempted by using a scrubber in which water and calcium oxide are sprayed into the flue gases containing the solid wastes and which results in a waste slurry containing some of the calcium sulphite. The principle objection to this method of partially removing the sulphur dioxide from the flue gases is the accumulation of very sizable amounts of the waste slurry and the problems of disposing of it.

In the present disclosure as illustrated in the schematic view of FIG. 1, calcium oxide (CaO) is introduced directly into the furnace or boiler 10 along with the powdered coal and air in controlled quantities so that the calcium oxide reacts with the sulphur dioxide ($SO_2$) forming calcium sulphite as solid waste material which along with the fly ash and some remaining sulphur dioxide, leaves the furnace or boiler 10 by way of the flue gas passageway 15. The dry solid waste particulates are then removed from the flue gas by the dual filter elements of the device of the invention as represented schematically in FIG. 1 of the drawings by the numeral 16 and the substantially clean flue gas then flows into the stack 17 and to atmosphere.

By referring now to FIG. 2 of the drawings, a horizontal section of the device 16 will be seen to comprise a housing 18 having a central passageway 19 extending therethrough and communicating at its opposite ends with the flue gas passageway 15 hereinbefore described. The central passageway 19 is defined by horizontally spaced partitions 20 and 21 which divide the housing 18 into the three substantially equal parts, the central passageway 19 being disposed midway between oppositely disposed rows of chambers 22 and 23 respectively.

The housing 18 is provided with top and bottom closures 24 and 25 respectively. The chambers 22 and 23 are defined by transversely arranged partitions 26 and 27 respectively and the longitudinally extending partitions 20 and 21 have vertically arranged slots 28 and 29 respectively formed therein in oppositely disposed relation.

As illustrated in FIG. 2 of the drawings, four panels 30 are positioned in the slots 28 and 29 respectively so as to be movable transversely of the central passageway 19.

In FIG. 3 of the drawings, a perspective view of one of the panels 30 may be seen and it will be observed that it is provided with two openings 31 and 32 respectively which are screened with stainless wire cloth 33 and 34 which is preferably of between 200 to 250 mesh.

By referring again to FIG. 2 of the drawings, it will be seen that each of the dual filter elements comprising the screened panels 30 is of a length approximately two-thirds of the width of the housing 18 so that it can be moved from a first position where the left hand opening 31 and screen 33 (see FIG. 3) is in registry with the central passageway 19 to an alternate position where the right hand opening 32 and the screen 34 are in registry with the central passageway 19.

In FIG. 2 of the drawings, the two screen panels 30 in the left half of the Figure, are shown with the left hand openings 31 and screens 33 in registry with the central passageway 19 while the two screened panels 30 in the right half of the figure are shown with the right hand openings 32 and screens 34 in registry with the central passageway 19 and it will be observed that the other screened openings in each of the panels 30 are therefore located in the chambers 23 and 22 respectively.

It will occur to those skilled in the art that means is provided for moving the screen panels 30 transversely of the device so as to move the screened openings from first positions in registry with the central passageway 19 to second positions where one of the screened openings in each of the panels is located in one of the chambers 22 and 23 respectively.

In FIG. 2 of the drawings, openings 35 and 36 respectively are formed in each of the chambers 22 and 23 respectively and on the left side of the positions in said chambers where parts of the screened panels 30 are alternately positioned. The openings 35 and 36 communicate by way of tubular members 37 and 38 with manifolds 39 and 40 respectively, which are in turn in communication with a suitable vacuum source.

Each of the chambers 22 and 23 are also provided with openings 41 which are positioned on the opposite sides of the positions occupied by the screened panels 30 when the same are in the respective chambers 22 and 23.

By referring now to FIG. 4 of the drawings, an enlarged detail of a portion of the device of the invention may be seen including a portion of one of the vertical side walls 18, a portion of the bottom closure 25 and illustrating a vacuum valve body 43 arranged in registry with one of the openings 35 in the chambers 22 as hereinbefore disclosed. The vacuum valve body 43 has an apertured slidable valve plate 42 arranged for movement into and out of the valve body 43 and it is provided with an arm 44 having a collar 45 arranged to position a coil spring 46 which normally urges the valve plate 42 to open position. A toggle lever 47 is pivoted to a bracket 48 on the bottom 25 of the housing 18 and links 49 slidably engaged in either end of the toggle lever 47 connect with a pin 50 which is movably positioned in an opening 51 in the side wall of the housing 18, the pin 50 being positioned so that it will be engaged and moved by the screen panel 30 when the same moves into the chamber 22 or 23 with which the pin 50 registers.

It will be understood that there are vacuum valve bodies 43 with their valve plates 42 in communication with each of the openings 35 and 36 in the chambers 22 and 23 as hereinbefore described and that the apparatus for moving the valve plates 42 to open position when a portion of a screened panel 30 is in the chamber 22 or 23 adjacent the vacuum valve is provided for each of the plurality of openings 35 and 36.

It will thus be seen that the vacuum is applied to the loaded side of each of the screens 33 or 34 when they are in respective cleaning positions in the chambers 22 and 23 as hereinbefore described and that when they are moved by the means on the top closure 24 of the device which engages lugs on the tops of each of the screen panels 30 to positions out of the respective cleaning chambers 22 and 23, the valve plates 42 are automatically closed by the springs 46 in each of the actuating mechanisms.

Modifications in the particular structure hereinbefore described are possible and one such modification which improves the efficiency of the device for filtering stack gases comprising coating the screens 33 and 34 with a catalytic material such as platinum and positioning the device in the flue gas passageway 15 so that temperatures of approximately 700° F. are imparted to the screens by the flue gas passing therethrough. Under such conditions, the catalytic material reacts with the remaining sulphur dioxide ($SO_2$) in the flue gas and effectively removes it to provide a clean emission to atmosphere.

The importance of the present invention is apparent when it is considered that a typical electric power generating plant using 2000 tons of coal of a $3\frac{1}{2}\%$ sulphur content per day produces 70 lbs. of sulphur per ton or 140 lbs. of sulphur dioxide per ton. The present practice of using powdered limestone ($CaCO_3$) is estimated to be about 50% efficient and the required approximately 250 lbs. of limestone per ton of coal results in the production of 135 lbs. of calcium sulphite per ton of coal or 270,000 lbs. per day which amounts to 135 tons. Based on these averages the generating plant would produce 11,000 lbs. per hour or 190 lbs. per minute or 3 lbs. per second of the calcium sulphite as a dry material and to this would be added fly ash in at least equal quantities but depending on the nonconsumable elements in the coal being used.

With the present invention utilizing four filters, each of approximately 48 inches of diameter, the indicated volume of dry solid wastes in the flue gas could be efficiently handled by reciprocating the screened panels of the device on a five second loading cycle per screen.

The foregoing advantages are of course increased when catalytic material is utilized on the screens of the screened panels and the catalytic conversion of the remaining sulphur dioxide is achieved.

Cost-wise the presently described invention used as hereindisclosed offers very substantial economies as compared with the only comparable system, as hereinbefore disclosed, which necessitates the use of a wet scrubber and the production of highly undesirable quantities of a calcium sulphite slurry with the present invention having an obvious advantage in that the waste products are dry solid particles and considerably easier to handle than the calcium sulphite slurry, while at the same time the present invention achieves a much higher percentage of removal of the entrained dry waste solids from the flue gases then any similar known method.

Although but two emodiments of the present invention have been illustrated and described, it will be apparent to those skilled in the art that various changes and modifications may be made therein without departing from the spirit of the invention and having thus described my invention what I claim is:

1. A device for filtering particulates from flue gases comprising a housing having top, bottom, side and end walls, said end walls having openings therein, first partitions in said housing defining a flue gas passageway therethrough communicating with said openings in said end walls, secondary partitions in said housing at right angles to said first partitions defining a plurality of chambers, said first partitions having slot-like openings therein communicating with each of said plurality of chambers, a plurality of panels slidably positioned in said slot-like openings for movement transversely of said first partitions and said flue gas passageway defined thereby, a plurality of filter elements positioned in side by side pairs in each of said plurality of panels, said chambers positioned to receive portions of said panels and one of each of said pairs of filter elements therein with the other one of each of said pairs of filter elements being in said flue gas passageway, said chambers having openings therein, means including vacuum conduits in communication with said openings for generating a substantial reverse air flow through each of said chambers and the filter elements therein so as to remove particulates from said filter elements, valves positioned and arranged in said vacuum conduits for allowing said reverse air flow through said chambers and said filter elements therein, said valves connected to said panels so as to be moved thereby.

2. The device for filtering flue gases set forth in claim 1 and wherein said filter elements comprise fine mesh screens.

3. The device for filtering flue gases set forth in claim 1 and wherein said plurality of filter elements arranged in side by side pairs comprise carrier materials and catalytic materials on said carrier materials arranged to catalytically convert sulphur dioxide in flue gases which pass through said filter elements.

4. The device for filtering flue gases set forth in claim 1 and wherein said means for generating a substantial reverse air flow through each of said chambers and said filter elements therein comprises a vacuum source.

5. The device for filtering flue gases set forth in claim 1 including means for reciprocating said panels with said filter elements therein from positions alternately positioning one of said filter elements in said flue gas passageway and in one of said chambers.

6. The device for filtering flue gases set forth in claim 1 and wherein said valves are connected to said panels by levers and members slidably positioned in said housing for engagement by said panels and said valves comprise valve bodies and apertured slide plates therein, said levers connecting said apertured slide plates and said members whereby said panels engaging said members move said apertured valve plates to open and close said valves.

* * * * *